Feb. 10, 1942. M. F. DESMOND 2,272,967
PERFORATION GAUGE FOR POSTAGE STAMPS
Filed Dec. 16, 1940
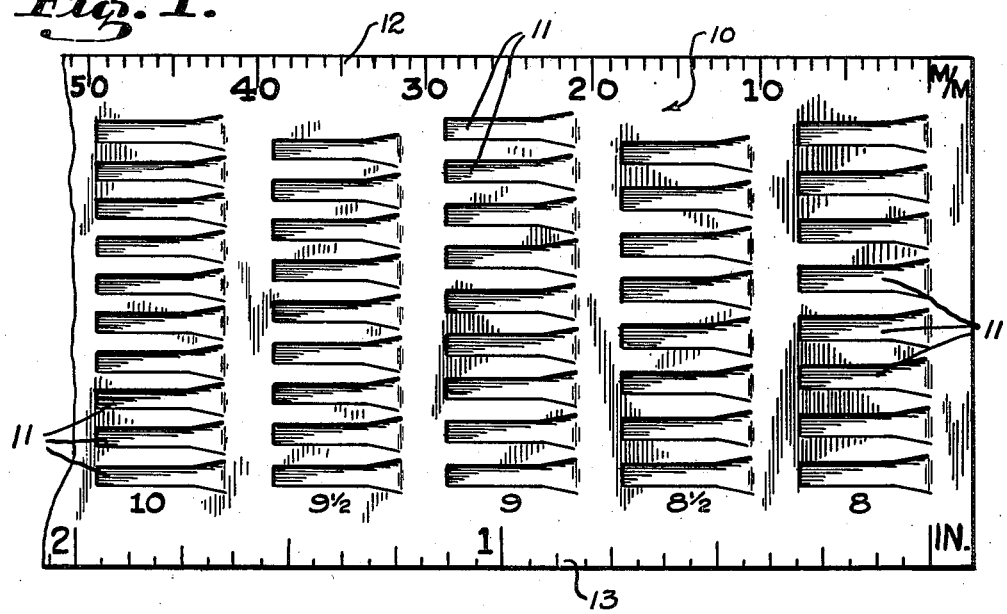
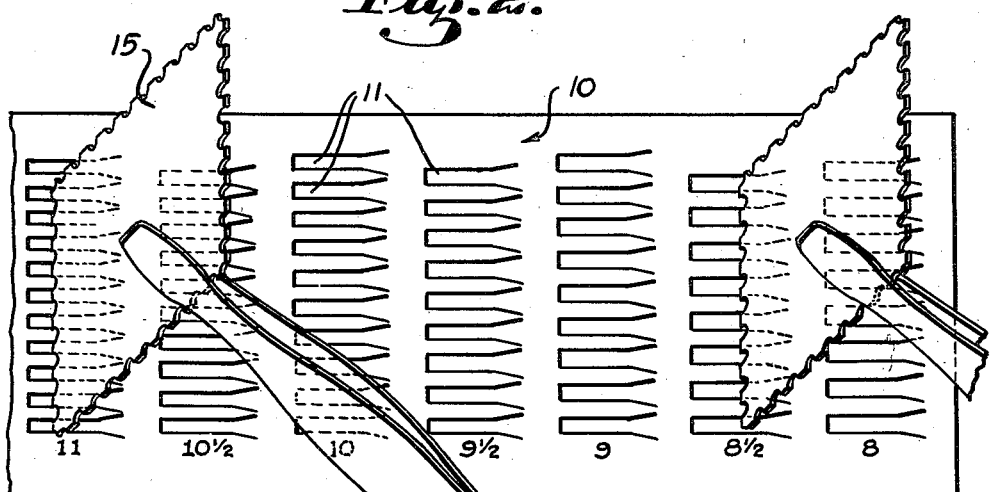
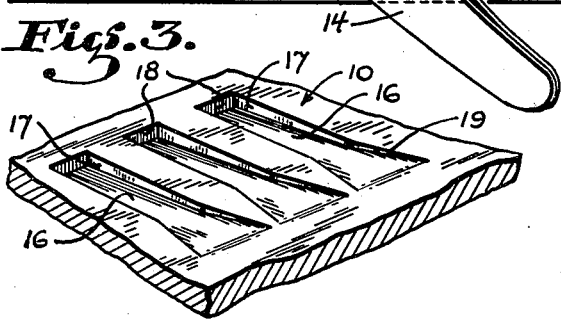
INVENTOR.
Matthew F. Desmond.
BY
Chas. E. Townsend.
ATTORNEY Patented Feb. 10, 1942

2,272,967

UNITED STATES PATENT OFFICE 2,272,967

PERFORATION GAUGE FOR POSTAGE STAMPS

Matthew F. Desmond, Burney, Calif.

Application December 16, 1940, Serial No. 370,315

4 Claims. (Cl. 33—174)

The present invention relates to perforation gauges for postage stamps, and particularly to features of such a gauge which facilitate rapid and accurate determination of the spacing of perforations on a stamp.

The classification of stamps by philatelists often requires a determination of the spacing of the perforations along the edges of the stamps. Standard gauging consists of a determination of the number of perforations per twenty millimeters measured lineally of the perforated edge. The most common form of gauge consists of a card or other article presenting a flat surface with rows of printed dots graduated in frequency, and numbered to designate the gauge represented by each row. The perforated edge of the stamp is matched with the proper row of dots to determine its gauge. The determination of the gauge is thus left entirely to the eye, and as perforations occur at spacings as close as seventeen in twenty millimeters, visual comparison with the rows of dots thus closely spaced is tedious and often inaccurate.

It is the object of the present invention to provide a perforation gauge which will facilitate the operation of accurately gauging perforations on postage stamps or the like, and to provide a gauge in which the proper position of a stamp may be found, at least in part, by the sense of touch.

Other objects and advantages of the invention will be made apparent in the following specification, wherein reference is made to the accompanying drawing.

In the drawing—

Fig. 1 is an enlarged plan view of a portion of a perforation gauge for postage stamps, constructed in accordance with the present invention;

Fig. 2 is a similar view on a smaller scale, illustrating the manner in which the stamps are presented to the gauge for measurement of their perforations; and Fig. 3 is an enlarged fragmentary perspective view illustrating a typical shape of grooves employed in the construction of the gauge.

The gauge, as shown in the drawing, is formed of a card or plate 10 of durable material, in which may be formed a plurality of rows of grooves generally indicated at 11. The material of which the plate 10 is formed may be metal, but is preferably some light durable composition capable of being molded or having the grooves formed therein by milling, cutting, or any other suitable process.

The grooves in each row 11 are equally spaced, as their purpose is to receive the interperforation projections of postage stamps or the like, and the size and spacing of the grooves in each row becomes increasingly smaller from a dimension of about seven or eight grooves in 20 millimeters at one end of the plate 10, to sixteen or seventeen grooves in 20 millimeters at the other end.

It is desirable that the plate 10 be provided with a millimeter scale 12 along one of its edges, and a scale of inches 13 along its opposite edge, as shown in Fig. 1, so that it may be used as a ruler or scale if desired, in addition to its intended use as a perforation gauge.

In order to gauge the spacing of perforations on the edge of a stamp, the stamp is held, preferably by tweezers, as shown at 14 in Fig. 2, and the stamp, shown at 15, may be held perpendicular to the gauge, or preferably at a slight angle, as indicated, with one of its edges presented to one of the rows of grooves of the gauge. The rows are preferably numbered, as indicated in Fig. 1, to designate the number of grooves per 20 millimeters, and if the interperforation projections of the stamp, when presented to the row, register with the grooves of the row, as shown at the left hand side of Fig. 2, the gauge of the perforations is known by the numeral opposite the same row. If, however, the stamp projections, as illustrated at the right hand of Fig. 2, fail to register perfectly with the grooves, the stamp must be moved to another row until registry is perfect and the gauge of the stamp is determined.

As the grooves and perforations on the stamps vary but slightly between different sizes of perforations, it is difficult to determine with the eye alone whether the interperforation projections are in exact registry with all of the grooves. Consequently, the grooves are formed in the manner illustrated in Fig. 3, where they are shown as having bottom surfaces 16 which slope upwardly toward their forward edges, and also as having vertical side walls 17 and vertical back walls 18, with the angles between the back walls and the horizontal surface of the plate 10 being sharply defined.

It is preferable also that all of the grooves in one end of the several rows be in alignment, as is shown in Figs. 1 and 2. With this construction and alignment of the grooves, a stamp held in the position indicated in Fig. 2 may be placed over the plate with one perforated edge in contact therewith, and then moved along from right to left, as viewed in Fig. 2, until its interperforation projections come into registry with one row of grooves or another. As shown in Fig. 3, the side walls 17 of the grooves may be flared outwardly as at 19 toward their forward ends to facilitate the registry of the interperforation projections with the grooves with which they should register. Any stamp passing over a row of grooves with which it does not register will ride above the grooves and pass freely over the surface of the card until it comes to the proper row of grooves, in which case its interperforation projections will be guided by the flared ends 19 into the grooves and upon coming to the vertical back walls 18 of the grooves sufficient resistance to its further movement will be encountered to indicate that it has reached its proper destination.

Important features of the grooves illustrated in Fig. 3 are the vertical walls 18 at the ends of the grooves, the abrupt angle between the top level of the plate and the side walls of the grooves, and the flared opening of the grooves at their forward end. It is to be understood, however, that variations from the specific shape shown may be made without losing the advantages to be obtained.

In using the gauge, a stamp may be placed with one of its edges in alignment with the aligned grooves at one end of the rows, and then moved along the surface of the card until its free motion is resisted by engagement of its interperforation projections with the end walls of the grooves with which it has registered. In this manner the sense of touch, as well as the sense of sight, is used in gauging the perforations, and a good deal of eye strain such as is encountered in the use of an ordinary perforation gauge is avoided.

Having thus described my invention, what I claim and desire to secure by Letters Patent is:

1. A perforation gauge for postage stamps or the like comprising a plate having a plane surface and having grooves formed in said surface, said grooves being sized and spaced to receive the interperforation projections of a stamp, the bottoms of said grooves being inclined upwardly toward one end and having walls substantially perpendicular to the plane surface of the plate at the other end.

2. A perforation gauge for postage stamps or the like comprising a plate having a plane surface and having grooves formed in said surface, said grooves being sized and spaced to receive the interperforation projections of a stamp, each groove having a substantially perpendicular back and side walls and having a bottom sloping upwardly from the back wall to the plane surface of the plate.

3. A perforation gauge for postage stamps or the like comprising a plate having a plane surface and having grooves formed in said surface, said grooves being sized and spaced to receive the interperforation projections of a stamp, each groove having a substantially perpendicular back and side walls and having a bottom sloping upwardly from the back wall to the plane surface of the plate, the side walls of the grooves being flared outwardly at their forward ends.

4. In a perforation gauge having a plane surface with spaced grooves formed therein for registry with the interperforation projections of a stamp, side walls and a back wall for each of said grooves formed at an abrupt angle with said plane surface, and a bottom wall sloping upwardly to merge gradually with said plane surface at the forward end of the groove.

MATTHEW F. DESMOND.